US009611952B2

(12) United States Patent
McCaskill

(10) Patent No.: US 9,611,952 B2
(45) Date of Patent: Apr. 4, 2017

(54) REDUCED CAVITATION OILFIELD CHOKE

(71) Applicant: National Oilwell Varco, L.P., Houston, TX (US)

(72) Inventor: Lane McCaskill, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 94 days.

(21) Appl. No.: 14/384,141

(22) PCT Filed: Mar. 1, 2013

(86) PCT No.: PCT/US2013/028694
§ 371 (c)(1),
(2) Date: Sep. 9, 2014

(87) PCT Pub. No.: WO2013/138092
PCT Pub. Date: Sep. 19, 2013

(65) Prior Publication Data
US 2015/0041690 A1 Feb. 12, 2015

Related U.S. Application Data

(60) Provisional application No. 61/610,622, filed on Mar. 14, 2012.

(51) Int. Cl.
*F16K 47/08* (2006.01)
*E21B 34/02* (2006.01)
*F16K 3/24* (2006.01)

(52) U.S. Cl.
CPC .............. *F16K 47/08* (2013.01); *E21B 34/02* (2013.01); *F16K 3/246* (2013.01)

(58) Field of Classification Search
USPC .................................................... 137/625.33
See application file for complete search history.

(56) References Cited

U.S. PATENT DOCUMENTS 3,631,891 A * 1/1972 Brumm ............... F16K 31/1266
137/625.3
3,704,726 A * 12/1972 Lewis ..................... F16K 47/08
137/625.3

(Continued)

FOREIGN PATENT DOCUMENTS

| CN | 201671596 U | 12/2010 |
| DE | 2422108 A1 | 11/1975 |
| WO | 0009923 A1 | 2/2000 |

OTHER PUBLICATIONS

Dantinne, P., International Search Report for International Patent Application No. PCT/US2013/028694, European Patent Office, dated Feb. 21, 2014.

(Continued)

*Primary Examiner* — John Fox
(74) *Attorney, Agent, or Firm* — Conley Rose, P.C.

(57) ABSTRACT

A choke with reduced cavitation and/or flashing due to a high pressure fluids passing through the choke includes a housing having a high pressure inlet port and a low pressure outlet port, and a cage positioned within the housing and having a passage for passing fluid therethrough. A plurality of beads are each positioned in the cage, such that fluid flows between the cage and the beads and between the beads when passing through the cage. Fluid pressure is reduced by the fluid passing through the cage, thereby reducing cavitation.

20 Claims, 3 Drawing Sheets

(56) References Cited

U.S. PATENT DOCUMENTS

| | | | |
|---|---|---|---|
| 3,731,903 A | | 5/1973 | Webb et al. |
| 3,826,281 A | * | 7/1974 | Clark ............... F16K 5/0605 |
| | | | 137/625.31 |
| 3,865,352 A | * | 2/1975 | Nelson ............... B01F 3/10 |
| | | | 138/42 |
| 4,103,702 A | * | 8/1978 | Duthion ............... F16K 3/26 |
| | | | 137/375 |
| 4,180,100 A | * | 12/1979 | Kolb ............... F16K 3/34 |
| | | | 137/625.3 |
| 4,212,321 A | * | 7/1980 | Hulsey ............... F16K 5/0615 |
| | | | 137/625.32 |
| 4,372,128 A | * | 2/1983 | Sarcia ............... F25B 9/14 |
| | | | 137/625.37 |
| 4,398,563 A | | 8/1983 | Kay et al. |
| 4,429,714 A | * | 2/1984 | Hughes ............... F16K 47/08 |
| | | | 137/625.3 |
| 4,665,946 A | * | 5/1987 | Hulsey ............... F16K 3/32 |
| | | | 137/625.3 |
| 4,762,146 A | * | 8/1988 | Ewbank ............... F16K 47/08 |
| | | | 137/625.3 |
| 7,073,532 B2 | * | 7/2006 | Bowe ............... F16K 1/123 |
| | | | 137/625.33 |
| 2004/0050433 A1 | | 3/2004 | Nawaz |
| 2005/0104023 A1 | | 5/2005 | Morton |
| 2008/0224075 A1 | | 9/2008 | Emin |

OTHER PUBLICATIONS

Dantinne, P., Written Opinion for International Patent Application No. PCT/US2013/028694, European Patent Office, dated Feb. 21, 2014.

* cited by examiner

REDUCED CAVITATION OILFIELD CHOKE

CROSS REFERENCE TO RELATED APPLICATIONS

The present invention is a 35 U.S.C. 371 application of PCT/US2013/028694 filed Mar. 1, 2013 claims priority to U.S. Provisional Application Ser. No. 61/610,622, filed Mar. 14, 2012, entitled "Reduced Cavitation Oilfield Choke", the contents of all of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Chokes have been used for decades in oilfield operations to reduce the fluid pressure of high pressure flowing fluids, which often contain solids and/or chemicals which significantly reduce the effective life of the choke. The life of a choke is also significantly reduced by cavitation and/or flashing that occurs when high pressure fluids are decompressed.

Various attempts have been made to reduce cavitation and flashing in chokes. Multiple concentric cages or multiple stacked disks may be used to define a torturous path through a choke, but these designs are very costly to manufacture. Stacked disks are disclosed, for example, in a Weir Power & Industrial brochure for their X-Stream choke. The cost of manufacturing multiple disks with varying diameter staggered cylinders extending from the disk face is a significant drawback to these designs.

The disadvantages of the prior art are overcome by the present invention, an improved reduced cavitation oilfield choke is hereinafter disclosed.

SUMMARY OF THE INVENTION

In one embodiment, a choke with reduced cavitation and/or flashing due to a high pressure fluids passing through the choke includes a housing having a high pressure inlet port and a low pressure outlet port, and a cage positioned within the housing and having a passage for passing fluid therethrough. A plurality of beads are each positioned in the cage, such that fluid flows between the cage and the beads and between the beads when passing through the cage. Fluid pressure is reduced by the fluid passing through the cage, thereby reducing cavitation.

The disclosure provides a choke with reduced cavitation and/or flashing due to high pressure fluids passing through the choke, comprising: a housing having a high pressure inlet port and a low pressure outlet port; one or more cages positioned within the housing and having one or more inlet ports to receive fluid into the cage and one or more outlet ports to allow fluid to exit the cage; an actuator; a flow controller coupled to the actuator and configured to at least partially block the inlet ports into at least one of the cages; and a plurality of beads positioned within a bead cage, such that fluid flows between the bead cage and the plurality of beads and between the beads when passing through the bead cage, and fluid pressure is reduced while fluid passes through the bead cage.

These and further features and advantages of the present invention will become apparent from the following detailed description, wherein reference is made to the figures in the accompanying drawings.

DETAILED DESCRIPTION OF PREFERRED EMBODIMENTS

Figure 1:
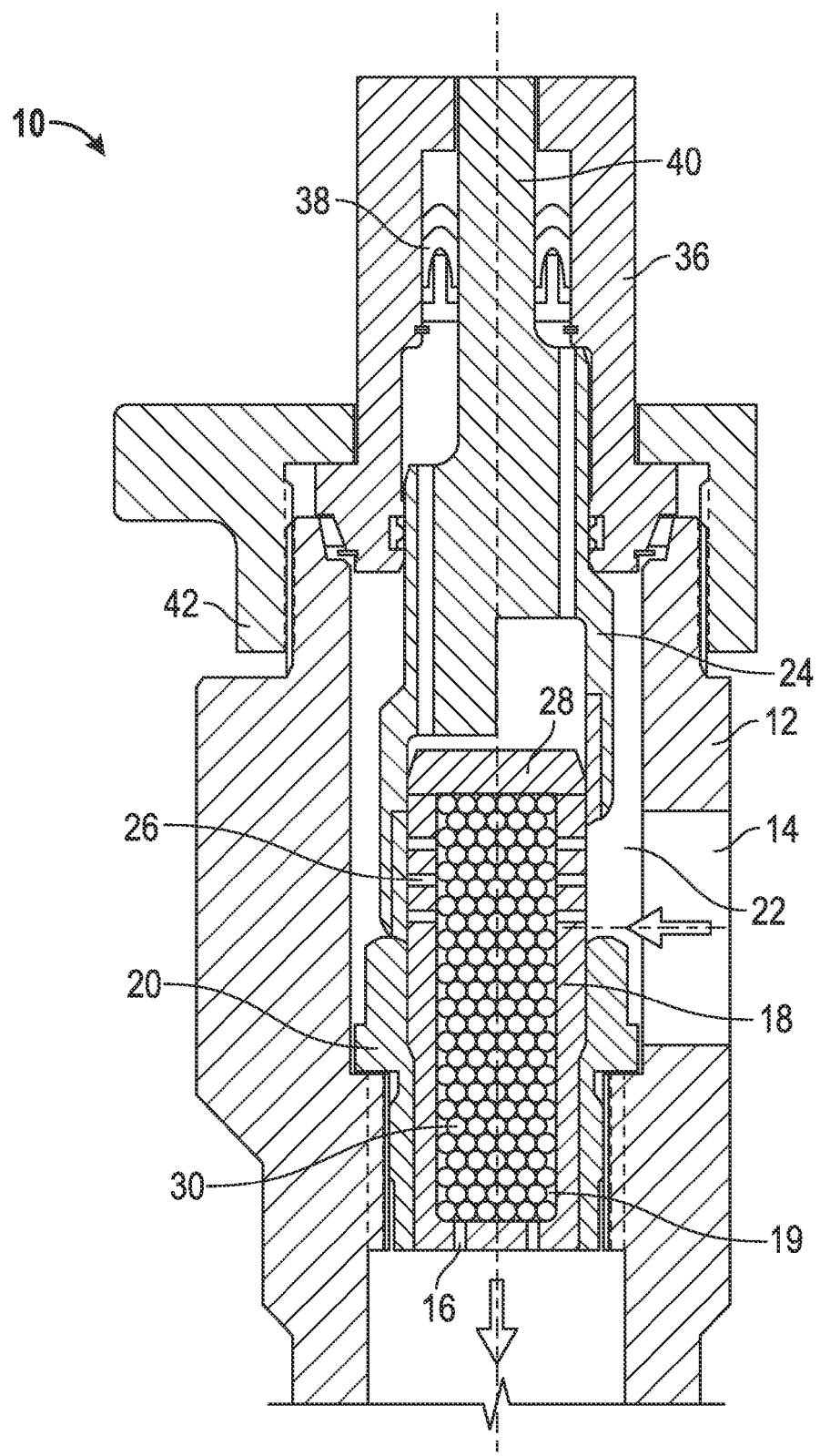
FIG. 1 is a cross-sectional view of one embodiment of a choke.

Referring to FIG. 1, a choke 10 includes a housing 12 having a high pressure inlet port 14 and a low pressure outlet port 16. A cage 18 is positioned within the housing and has an internal passage 19 for passing fluid therethrough. A choke seat 20 may be threaded to the housing 12, and the cage 18 may be shrink fit or otherwise secured to the choke seat. In FIG. 1, fluid enters through the side of the housing 12 and flows into an annulus 22 between a flow controller, such as the control sleeve 24, and the cage 18. The sleeve 24 may be moved axially up or down relative to the cage to open or close respective ones of a plurality of the ports 26 in the side of the cage. In FIG. 1, the left side of the drawing shows the sleeve fully closed, while the right side of the drawing shows the sleeve fully opened. When the sleeve exposes the ports 26, fluid flows into a cage and to the bottom of the choke, then out the port 16. Cap 36 encloses the upper end of sleeve 24, and seal ring 38 seals between the cap and the rod 40 at the upper end of sleeve 24. Nut 42 threads to the housing 12 and stabilizes the cap 36. Ports 26 may direct fluid in the form of jets directed to and impinging other jets within the cage 18, thereby adding a valuable stage to fluid deceleration without cavitation.

According to the present invention, cavitation may be significantly reduced by providing beads 30 within the cage. The beads can be made of tungsten carbide, or other wear and/or chemical resistant materials. The beads 30 effectively fill the interior of the cage 18, and may be sintered to the cage prior to any other heat treating operations. Once the cage is filled with beads, a cap 28 may be placed on top of the cage 18, thereby slightly compressing the beads 30 within the cage. The cage and the plurality of beads may then be sintered by a hot isostatic pressing operation (HIP) to form a single integral unit, with the beads bonded to each other and to the cage. As the high pressure fluid flows through the tortuous path between and around the beads, energy is dissipated so that no single pressure drop stage in the choke reduces fluid pressure below the point where cavitation or flashing occur. The beads also do not present any sharp corners to erosive fluids that can quickly wear down and decrease the effective life of the trim. By providing beads made from tungsten carbide, the chemical attacks on the beads are significantly reduced. The use of beads within the cage significantly reduces the cost of manufacturing the choke compared to prior art designs.

Figure 2:
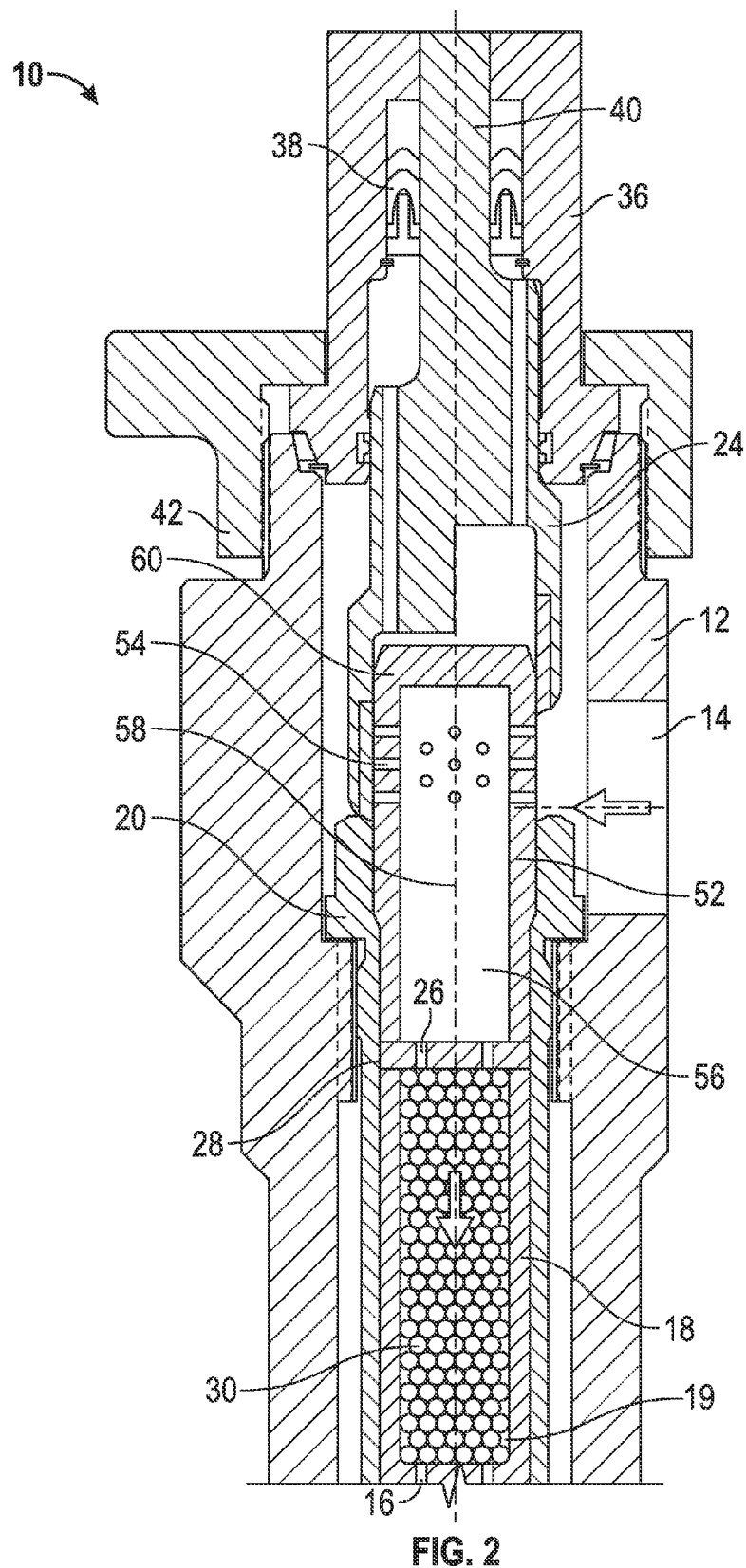
FIG. 2 is a cross-sectional view of an alternate embodiment of a choke.

FIG. 2 is an alternate embodiment of a choke, wherein functionally similar components discussed in the FIG. 1 embodiment have the same reference numerals in FIG. 2.

Like FIG. 1, the left side of the drawing shows the sleeve fully closed, while the right side of the drawing shows the sleeve fully opened. In the FIG. 2 embodiment, cage 18 enclosing the beads 30 is downstream from jet cage 52, which receives fluid from port 14 and passes fluid through ports 54 into the interior 56 of jet cage 52. As previously discussed, ports 54 are preferably radially offset, so that an impinging jet directed to the centerline 58 ideally meets a similar jet, with the result being that some fluid is directed to the upper endplate 60 of the cage 52, and fluid velocity is substantially reduced without cavitation or flashing.

The FIG. 2 design thus uses the jet cage 52 to receive fluid in the passageway 56, and passes fluid through ports 26 in the top 28 of the cage 18. Fluid passes by the beads 30 and exits through the plurality of discharge ports 16. The FIG. 2 design is preferred for some applications since additional deceleration stages reduce the drag on the beads 30 compared to the FIG. 1 design.

Figure 3:
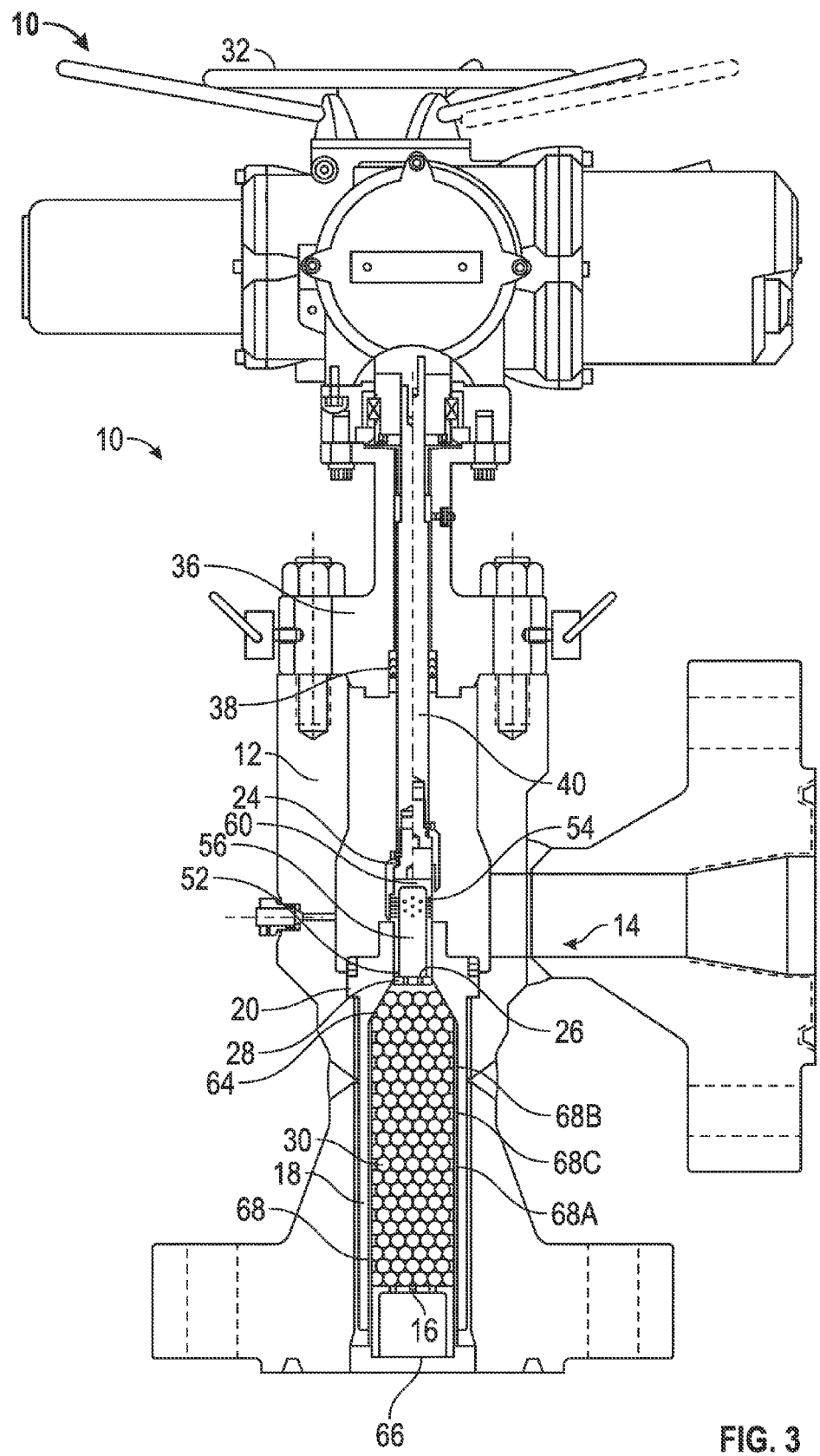
FIG. 3 is a cross-section view of another embodiment of a choke.

FIG. 3 is a cross-section view of another embodiment of a choke. A portion of the choke 10 resembles the embodiment in FIG. 2 and similar components discussed in the FIG. 2 embodiment have the same reference numerals in FIG. 3. Like FIG. 2, the left side of the drawing shows the sleeve fully closed, while the right side of the drawing shows the sleeve fully opened. The choke 10 includes the valve components described above to choke the flow of fluids from the high pressure inlet port 14 through the choke to exit the low pressure outlet port 16. An actuator, which can be manual or powered, can raise and lower the stem 40 with a flow controller, such as the control sleeve 24, to uncover, partially cover, or completely cover the inlet ports 54 of the jet cage 52, thereby unblocking, partially blocking, or completely blocking fluid flow into the interior 56 of the jet cage 52. Ports 26 of the top cap 28 allow fluid to flow from the interior of the jet cage into the bead cage 18.

The fluid flow can spread across the beads 30 around the inlet taper 64 of the bead cage. The bead cage 30 can be threaded substantially a full length of its inner diameter 68. Without limitation and merely as an example, a coarse thread, such as an ACME type thread, of 4 threads per inch or less could be used. A lid, such as an end plug 66, having mating threads to the inner diameter 68 can be threaded into the bead cage 18 after the beads are assembled within the bead cage. Other types of lids than a threaded plug can be used, as would be apparent to one with ordinary skill in the art, and the plug is exemplary. Outlet ports 16 can be formed in the end plug 66 to allow the fluid to exit the bead cage at a reduced pressure relative to the pressure in the interior 56 of the jet cage 52. The fluid exiting the bead cage 18 through the ports 16 can then flow into the low pressure outlet port 16 and out of the choke 10.

The position of the end plug 66 can be adjusted along the threaded inner diameter 68 of the bead cage 18. The adjustability allows different loadings of beads into the bead cage to increate a performance range of the choke for different flows while being able to use the same structure as trim. Further, the bead cage can be disassembled and cleaned in the field of installation if the bead cage becomes plugged from solids and other impurities. This adjustability can further allow the end plug to be tightened sufficiently to compress free space between the beads in the bead cage to maintain contact between bead surfaces and restrict unwanted flow paths of the fluid therethrough.

The threaded inner diameter 68 solves another persistent challenge in the art. An issue with chokes is the undesirable fluid flow around the surface of the inner diameter 68, so that the fluid bypasses substantial contact with the bead surfaces. Typically, the fluid takes the path of least resistance and with the smooth surface around the inner diameter 68, the fluid flow is able to increase along the smooth wall of the inner diameter, thus decreasing the choke efficiency for reducing the pressure. By contrast, the present invention provides a roughed surface on the inner diameter 68. The term "roughened" is intended to be interpreted broadly and includes various deformations of an otherwise smooth surface that includes threads, channels, porosity, and other surface interruptions. In at least one embodiment, the roughed surface is formed by a threaded surface on the inner diameter. The threaded surface provides a rough surface that inhibits the ability of the fluid to flow and causes more contact with the fluid. The full length of the inner diameter can be threaded to provide for maximum surface area to be roughened. However, lesser amounts of the surface of the inner diameter can be roughened through threading. Further, a portion 68A of the inner diameter could be threaded for the end plug 66, and another portion 68B of the inner diameter be roughened without threading. The roughened portion 68B could include an optional liner 68C of rough matter inserted into the bead cage into which the beads could be assembled and then capped with the end plug 66 engaged with the threads to compress the space of the bead cage with the beads and secure the beads in position.

A plurality of beads provide the desired effect of reducing fluid pressure without cavitation. Various geometric shapes of beads with or without sharp edges may be used to fill the cage and provide the desired tortuous flow path through the choke. For example, solid shapes can be without limitation spheroidal, such as round, oval, or elliptical configuration or any combination of such may be used. The beads can be balls, pebbles, or rocks, whether smooth or rough with sharp edges, or other objects that can be packed into one or more of the cages to form a circuitous flow path to reduce pressure of the fluid as it flows through the cage, and thus, the term "beads" in used broadly to encompass all such objects. Also, the design as discussed above effectively secures the beads within the cage, so that individual beads cannot move relative to the cage over time. Movement of beads within the cage will likely be deleterious to the life of the trim. Also, beads of a varying diameter provide more obstructions to the flow of fluid, and may be preferred for some applications. The diameter of the beads may also vary as a function of their position in the flow passageway through the cage. In other applications, it may be sufficient to provide beads within the cage and compress the beads with a lid, as discussed above, without using a sintering or other operation to bond the beads to each other and to the cage. For all embodiments, beads may also be formed from stainless steel or other metal, or from glass or a ceramic, and may be bonded to each other by an epoxy or other adhesive.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A choke with reduced cavitation and/or flashing due to high pressure fluids passing through the choke, comprising:

a housing having a high pressure inlet port and a low pressure outlet port;

one or more cages positioned within the housing and having one or more inlet ports to receive fluid into the cages and one or more outlet ports to allow fluid to exit the cages, wherein one of the cages comprises a bead cage;

an actuator;

a flow controller coupled to the actuator and configured to at least partially block the inlet ports into at least one of the cages; and a plurality of beads positioned within the bead cage, such that fluid flows between the bead cage and the plurality of beads and between the beads when passing through the bead cage, and fluid pressure is reduced while fluid passes through the bead cage, wherein the one or more outlet ports of the bead cage are formed in a lid removable secured to the bead cage, and wherein at least a portion of a length of the bead cage inner diameter is threaded and the lid is formed with mating threads.

2. The choke of claim 1, wherein the flow controller comprises a control sleeve axially movable with the actuator to open and close the inlet ports into the bead cage.

3. The choke of claim 1, wherein another of the cages comprises a jet cage disposed upstream from the bead cage and the inlet ports of the jet cage receive fluids from the high pressure inlet port and the one or more outlet ports of the jet cage pass fluid into the bead cage, wherein an interior of the jet cage is in fluid communication through the one or more outlet ports with an interior of the bead cage.

4. The choke of claim 3, wherein at least one inlet port of the jet cage is positioned in a side of the jet cage and radially opposite another inlet port, such that jetstreams from the side inlet ports impinge within the sleeve.

5. The choke of claim 1, wherein the lid is configured to retain the plurality of beads in the cage.

6. The choke of claim 5, wherein the lid is adjustably engaged with the bead cage to compress a variety of quantities of beads loaded into the bead cage for different flow ranges of the choke.

7. The choke of claim 1, wherein the cage is shrink fit onto a choke seat which is secured to a housing of the choke.

8. The choke of claim 1, wherein the beads are bonded to each other and to the cage.

9. The choke of claim 8, wherein the beads are bonded to each other and to the cage by a sintering operation.

10. The choke of claim 1, wherein the beads are spheroids.

11. A choke, comprising:

a housing having a high pressure inlet port and a low pressure outlet port;

one or more cages positioned within the housing and having one or more inlet ports to receive fluid into the cages and one or more outlet ports to allow fluid to exit the cages, wherein a first one of the cages comprises a bead cage;

an actuator;

a flow controller coupled to the actuator and configured to at least partially block the inlet ports into at least one of the cages; and a plurality of beads positioned within the bead cage, such that fluid is permitted to flow between the bead cage and the plurality of beads and between the beads when passing through the bead cage, wherein the plurality of beads are bonded to each other and to the cage.

12. The choke of claim 11, wherein the flow controller comprises a control sleeve axially movable with the actuator to open and close the inlet ports into the bead cage.

13. The choke of claim 11, wherein a second one of the cages comprises a jet cage disposed upstream from the bead cage, wherein the inlet ports of the jet cage receive fluids from the high pressure inlet port, and the one or more outlet ports of the jet cage pass fluid into the bead cage, and wherein an interior of the jet cage is in fluid communication through the one or more outlet ports with an interior of the bead cage.

14. The choke of claim 13, wherein at least one inlet port of the jet cage is positioned in a side of the jet cage and radially opposite another inlet port, such that jetstreams from the side inlet ports impinge within the sleeve.

15. The choke of claim 11, further comprising a lid removable secured to the bead cage to retain the plurality of beads in the cage.

16. The choke of claim 15, wherein at least a portion of a length of the bead cage inner diameter is threaded and the lid is formed with mating threads.

17. The choke of claim 15, wherein the one of more outlet ports of the bead cage are formed in the lid.

18. The choke of claim 11, wherein the cage is shrink fit onto a choke seat which is secured to a housing of the choke.

19. The choke of claim 11, wherein the beads are bonded to each other and to the cage by a sintering operation.

20. A choke with reduced cavitation and/or flashing due to high pressure fluids passing through the choke, comprising:

a housing having a high pressure inlet port and a low pressure outlet port;

one or more cages positioned within the housing and having one or more inlet ports to receive fluid into the cages and one or more outlet ports to allow fluid to exit the cages, wherein one of the cages comprises a bead cage;

an actuator;

a flow controller coupled to the actuator and configured to at least partially block the inlet ports into at least one of the cages; and a plurality of beads positioned within the bead cage, such that fluid flows between the bead cage and the plurality of beads and between the beads when passing through the bead cage, and fluid pressure is reduced while fluid passes through the bead cage, wherein the one or more outlet ports of the bead cage are formed in a lid removable secured to the bead cage;

wherein the lid is configured to retain the plurality of beads in the cage; and wherein the lid is adjustably engaged with the bead cage to compress a variety of quantities of beads loaded into the bead cage for different flow ranges of the choke.

* * * * *